Dec. 14, 1926.  1,610,418
G. H. BRAWNER ET AL
PISTON RING
Filed April 28 1925    2 Sheets-Sheet 1
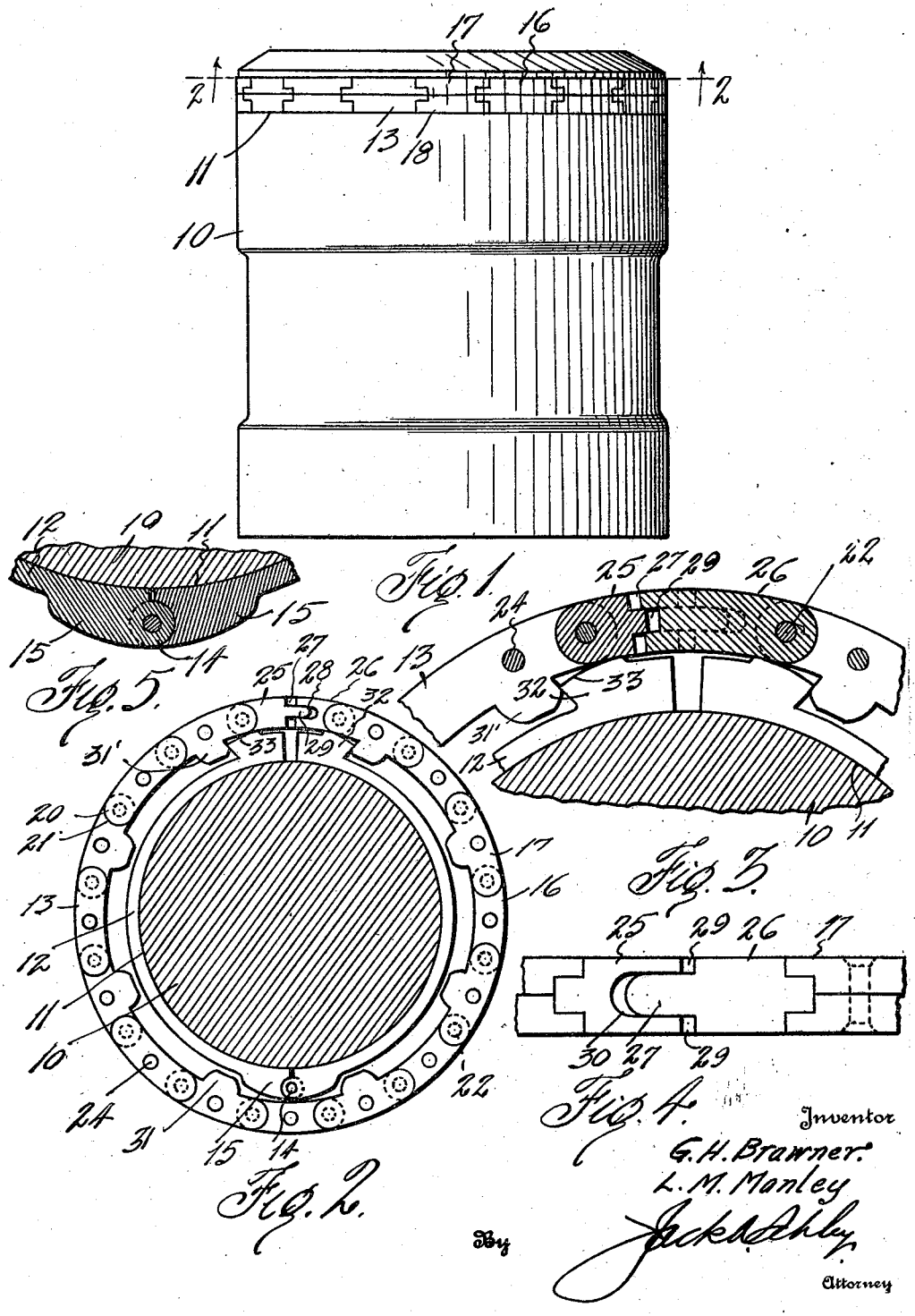
Inventor
G. H. Brawner.
L. M. Manley
By Jack A. Ashley
Attorney Dec. 14, 1926.  G. H. BRAWNER ET AL  1,610,418
PISTON RING
Filed April 28, 1925   2 Sheets-Sheet 2

Inventor
G. H. Brawner
L. M. Manley
By Jack A. Ashley
Attorney

Patented Dec. 14, 1926.

1,610,418

UNITED STATES PATENT OFFICE.

GEORGE H. BRAWNER AND LEWIS M. MANLEY, OF DALLAS, TEXAS, ASSIGNORS TO BRAWMAN PISTON RING COMPANY, OF DALLAS, TEXAS, A CORPORATION OF TEXAS.

PISTON RING.

Application filed April 28, 1925. Serial No. 26,355.

This invention relates to new and useful improvements in piston rings.

The object of the invention is to provide certain improvements in the type of ring set forth in the patent of George H. Brawner, No. 1,548,179, dated August 4, 1925.

The invention has particularly to do with piston rings which will fit, truly circular cylinder walls as well as those which are out of round.

A particular object of the invention is to provide an articulated ring in combination with an internal expander arranged to circumferentially adjust the links of the ring to conform to the contour of the cylinder wall.

Another object of the invention is to provide a unit structure for the links, whereby each link may be formed of like parts, thus reducing the cost of manufacture and simplifying the construction.

A further object is to provide means whereby the wear on the face of the ring is compensated by an automatic adjustment of the expander.

Another object of the invention is to provide a ring comprising a floating annulus held in contact with the walls of the cylinder by an internal resilient expander engaging the annulus at its lock joint and being substantially free from contact at other points, whereby said annulus is not only held under an even tension, but is self conforming to the contour of the cylinder walls.

A still further object of the invention is to provide means on the expander for holding the annulus against collapsing and at the same time to provide sufficient space therebetween to permit the links of the annulus to adjust themselves to the cylinder walls.

A construction designed to carry out the invention will be hereinafter described together with other features of the invention.

Figure 6:
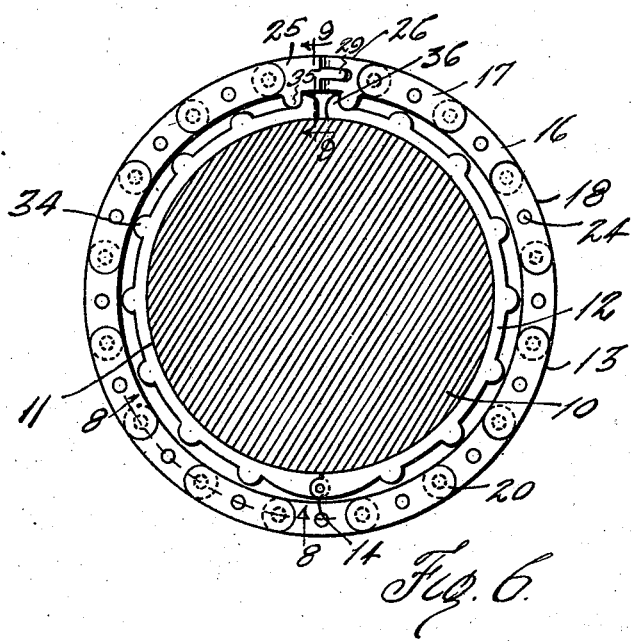
Figure 7:
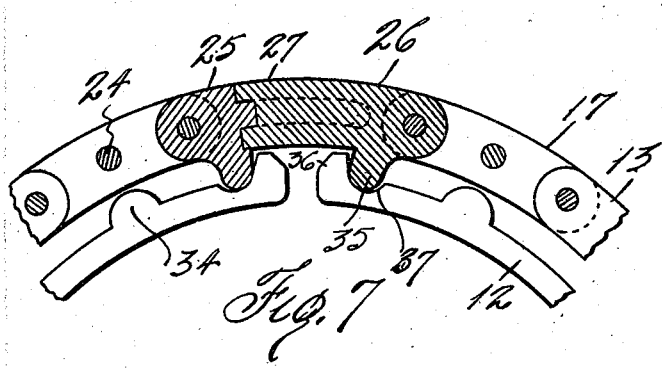
Figure 9:
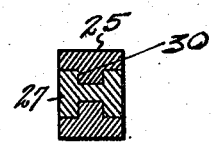
Figure 8:
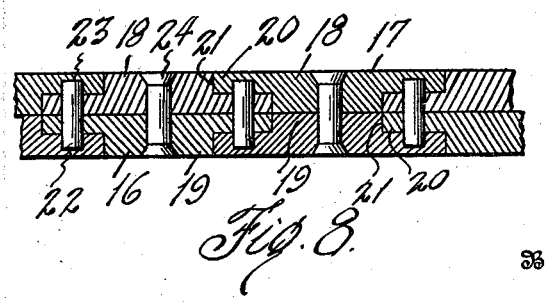
Figure 10:
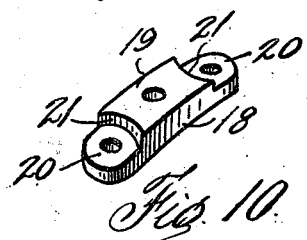

The invention will be more readily understood from a reading of the following specification and by reference to the accompanying drawings, in which an example of the invention is shown, and wherein:

Fig. 1 is an elevation of a piston equipped with a ring constructed in accordance with our invention, Fig. 2 is a cross-sectional view taken on the line 2—2 of Fig. 1, Fig. 3 is an enlarged cross-sectional view of the lock and joint connection between the ends of the ring and the expander, Fig. 4 is an enlarged face view of the lock, Fig. 5 is a cross section of the hinge joint of the expander, Fig. 6 is a horizontal cross-sectional view of another form in which the invention may be carried out, Fig. 7 is an enlarged view partly in section of the lock and expander connection of the same, Fig. 8 is an enlarged cross-sectional view taken on the line 8—8 of Fig. 6, Fig. 9 is an enlarged cross-sectional view of the annulus taken on the line 9—9 of Fig. 6, and Fig. 10 is a perspective view of one of the link units.

In the drawings the numeral 10 designates a piston which may be of any suitable construction. In the upper end of the piston is cut a circumferential groove 11 which is somewhat deeper than the usual ring groove and therefore the piston must have more stock at this point than is usually cast in a piston.

Our improved ring comprises two concentric members, an inner member or expander 12 and an outer ring member or annulus 13. The expander is preferably made of spring steel, but any other metal suitable for the purpose may be used. The expander is surrounded by the annulus and serves to hold the latter in engagement with the walls of the cylinder. This expander is split into two semicircular members joined by a hinge 14 at which point the expander has radial enlargements or bosses 15.

The annulus 13 which corresponds to the ordinary piston ring is composed of relatively short links or segments which are made into male members 16 and female members 17 in alternate relation. Each member is formed of two link units 18, each unit comprising a central boss (Figs. 8 and 10) 19 between ears 20 at the ends of the unit. Sockets 21 are formed in each end of the boss. For forming the male links 16 two units are placed with their backs together (Fig. 8) so that their ears 20 are in contact and form lugs at each end.

In forming the female member or link 17 the bosses of two units 18 are placed together (Fig. 8), whereby ears are spaced apart for receiving the lugs of the male links. When the links are assembled the ears of one engage in the sockets of the other. The ears 20 of the male links 16 are punched and receive short hinge pins 22. These pins have their ends seated in sumps 23 in the inner faces of the ears 20 of the female links 17 and in concentric relation to the sockets 21 to form hinge joints. The units are fastened together by countersunk rivets 24, thus confining the pins and holding the link units 18 together. The outer faces of the link units are finished smooth and lie flush.

In order to fasten the ends of the annulus together, a lock link 25 is pivoted to one end and a second lock link 26 is pivoted to the other end of the annulus. The link 26 (Figs. 2, 3 and 4) has a central tongue 27 provided with grooves 28 on its upper and under surfaces and these grooves extend into the link proper. The link 25 has a pair of spaced fingers 29 and a socket 30 on each side, the said fingers straddling the tongue and sliding into the grooves 28, while the tongue is received between the fingers and in the sockets 30. This makes a leakproof joint and one which will permit the annulus to expand radially without becoming disengaged.

The male links 17 each carry an inwardly extending boss 31 and the bosses 31' of the end links 17 are cut back on their adjacent faces to engage lugs 32 on the ends of the hinged members 12 of the expander. On the outer sides of the lugs cams 33 are formed and these ride on the inner faces of the lock links 25 and 26. The members 12 of the expander are formed on an arc having a radius greater than that of the bottom of the groove 11 and consequently when said members are confined in said groove, their tendency is to spread and expand.

The lugs 32 being between the bosses 31' will act to spread the annulus which by reason of its lock joint may in turn enlarge circumferentially. Thus the links of the annulus will seat themselves against the walls of the cylinder, irrespective of the contour of said walls, whether they are round or elliptical. The bosses 31 are employed merely to keep the articulated annulus from collapsing when placing the ring in the groove of the piston.

It is pointed out that when the expander spreads and displaces the annulus into contact with the cylinder walls, the bosses will not contact with the expander, thus the annulus becomes floating and is under an even tension entirely around its circumference. The floating annulus under an even tension will cause an even wearing of the annulus. The cams 33 act to force the lock links 25 and 26 outward and to compensate wear. It is apparent that the articulated annulus will readily conform itself to the irregular curves of a worn cylinder wall. The spreading of the expander will hold the annulus against the cylinder walls at all points and thus maintain compression.

In Figs. 6 to 9 inclusive we have shown a preferable form of the invention. In these figures parts which have been previously described are indicated by the same numerals. Instead of providing bosses on the links 16 and 17, bosses 34 are provided on the expander for each link. The links 25 and 26 are formed with bosses 35 and lugs 36 are provided on the ends of the expander, which also has seats 37 for the ends of the bosses 35. This enables each link 16 and 17 to be made of exactly the same units; also the expanding lugs and bosses 35 are more simple.

Various changes in the size and shape of the different parts, as well as modifications and alterations may be made within the scope of the appended claims.

What we claim, is:

1. A link unit for an articulated piston ring comprising a body having one face in a single plane and a central boss upon its opposite face forming pivoting ears at the ends of the body.

2. A piston ring comprising an articulated annulus having interlocking links at its ends, and a resilient expander within the annulus and engaging said links for spreading the same and contributing circumferential movement to the annulus.

3. In a piston ring, an annulus formed of a plurality of relatively short links joined together as in a chain, and a hinged expander within the annulus having elements at its split ends for engaging and spreading the annulus circumferentially.

4. In a piston ring, an annulus formed of a plurality of relatively short links joined together as in a chain, a hinged expander within the annulus having elements at its split ends for engaging and spreading the annulus circumferentially, and means for preventing the annulus from collapsing.

5. In a piston ring, an annulus formed of a plurality of relatively short links joined together as in a chain, and an expander composed of two resilient members hinged together and having engagement at their ends with the annulus.

6. In a piston ring, an annulus formed of a plurality of relatively short links joined together as in a chain and having their ends connected by interlocking links provided with bosses, and an expander within the annulus composed of resilient members hinged together and having lugs at its ends engaging between the bosses of the interlocking links.

7. In a piston ring, an annulus formed of a plurality of relatively short links joined together as in a chain and having their ends connected by interlocking links provided with bosses, an expander within the annulus composed of resilient members hinged together and having lugs at its ends engaging between the bosses of the interlocking links, and other bosses between the annulus and the expander.

In testimony whereof we affix our signatures.

GEORGE H. BRAWNER.
LEWIS M. MANLEY.